(12) United States Patent
Doyle

(10) Patent No.: US 10,361,468 B2
(45) Date of Patent: Jul. 23, 2019

(54) ELECTROLYTE LEVEL GAUGE

(71) Applicant: DOYLE MANUFACTURING, INC., Holland, OH (US)

(72) Inventor: Michael A. Doyle, Holland, OH (US)

(73) Assignee: DOYLE MANUFACTURING, INC., Holland, OH (US)

( * ) Notice: Subject to any disclaimer, the term of this patent is extended or adjusted under 35 U.S.C. 154(b) by 446 days.

(21) Appl. No.: 15/348,164

(22) Filed: Nov. 10, 2016

(65) Prior Publication Data

US 2017/0162919 A1   Jun. 8, 2017

Related U.S. Application Data

(60) Provisional application No. 62/263,110, filed on Dec. 4, 2015.

(51) Int. Cl.
| | | |
|---|---|---|
| *H01M 10/48* | (2006.01) | |
| *H01M 6/50* | (2006.01) | |
| *H01M 2/12* | (2006.01) | |

(52) U.S. Cl.
CPC ......... *H01M 10/484* (2013.01); *H01M 2/127* (2013.01); *H01M 6/505* (2013.01); *H01M 10/488* (2013.01)

(58) Field of Classification Search
None
See application file for complete search history.

(56) References Cited

U.S. PATENT DOCUMENTS 3,915,753 A * 10/1975 Melone ............... G01F 23/2922
429/91
9,893,391 B1 * 2/2018 Kauffman ........... H01M 10/488

* cited by examiner

*Primary Examiner* — Wyatt P McConnell
(74) *Attorney, Agent, or Firm* — Shumaker, Loop & Kendrick, LLP; James D. Miller

(57) ABSTRACT

An electrolyte level gauge comprises a housing defining a condensation chamber having a plurality of condensing elements disposed therein. The condensation chamber is in fluid communication with an electrolyte through a first vent aperture and an ambient environment through a second vent aperture. The electrolyte level gauge further comprises a sight member having a hollow interior and an indicator having a first end slidingly disposed in the hollow interior of the sight member and a second end including a float. The float is configured to be buoyant on the electrolyte.

20 Claims, 7 Drawing Sheets

ELECTROLYTE LEVEL GAUGE

CROSS-REFERENCE TO RELATED APPLICATION

This application claims priority to U.S. Provisional Patent Application Ser. No. 62/263,110, filed Dec. 4, 2015, the entire disclosure of which is hereby incorporated herein by reference.

FIELD OF THE INVENTION

The invention relates to a battery, and more particularly to an electrolyte level gauge for a battery.

BACKGROUND OF THE INVENTION

Electrolytes are commonly employed as a catalyst in a battery to promote movement of ions between an anode of the battery and a cathode of the battery during charging and discharging. Electrolytes may be aqueous, gelled, or dry electrolytes comprising soluble salts, acids, or bases.

During charging and discharging of the battery, a process referred to as cycling, electrolytes may be converted into a gas as water mixed with the electrolytes is separated into hydrogen and oxygen. In the case of unsealed batteries, the gas may be allowed to freely escape from the battery, subjecting the battery to drying out as the water mixed with the electrolyte is gradually reduced. Similarly, in unsealed batteries, the electrolytes may be subjected to the natural effects of evaporation, and water vapor may escape through vents and other openings in the battery.

Alternatively, sealed a sealed battery is designed to trap the gases within the battery to allow the gaseous hydrogen and oxygen to recombine into liquid water, preventing drying out of the battery. However, sealed batteries are configured to include regulating valves and vents to release gases from the battery in instances where pressure within the battery becomes excessive.

To maintain performance of the battery, a level of the electrolytes within the battery must be maintained within a predetermined range. For example, in a dry battery, where the level of the electrolytes is low, the battery may not charge to a full capacity, and high voltages may be indicated during charging since the battery is unable to draw current.

To ensure optimum operating conditions, the battery may include a means of measuring and indicating the level of electrolytes within the battery. Known level gauges for electrolytes may be fitted to an opening of the battery. For example, the level gauges may be installed in place of battery vent caps. Consequently, the level gauges generally include a means of venting to allow pressure buildup within the battery to be vented, if necessary. As discussed hereinabove, venting may have the negative consequence of drying out the battery.

Accordingly, there exists a need in the art for a means of measuring and indicating a level of electrolytes within a battery while minimizing a loss of electrolytes from within the battery.

SUMMARY OF THE INVENTION

In concordance and agreement with the present invention, a means of measuring and indicating a level of electrolytes within a battery while minimizing a loss of electrolytes from within the battery has surprisingly been discovered.

In one embodiment, an electrolyte level gauge comprises a housing defining a condensation chamber having a plurality of condensing elements disposed therein. The condensation chamber is in fluid communication with an electrolyte through a first vent aperture and an ambient environment through a second vent aperture. The electrolyte level gauge further comprises a sight member having a hollow interior and an indicator having a first end slidingly disposed in the hollow interior of the sight member and a second end including a float. The float is configured to be buoyant on the electrolyte.

In another embodiment of the invention, a battery assembly comprises a battery housing having a vent port formed therein, an electrolyte disposed within the battery housing, and an electrolyte level gauge configured for installation into the vent port of the battery housing. The electrolyte level gauge comprises a gauge housing defining a condensation chamber having a plurality of condensing elements disposed therein. The condensation chamber is in fluid communication with an electrolyte through a first vent aperture and an ambient environment through a second vent aperture. The electrolyte level gauge further comprises a sight member having a hollow interior and an indicator having a first end slidingly disposed in the hollow interior of the sight member and a second end including a float. The float is configured to be buoyant on the electrolyte.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION

Figure 1:
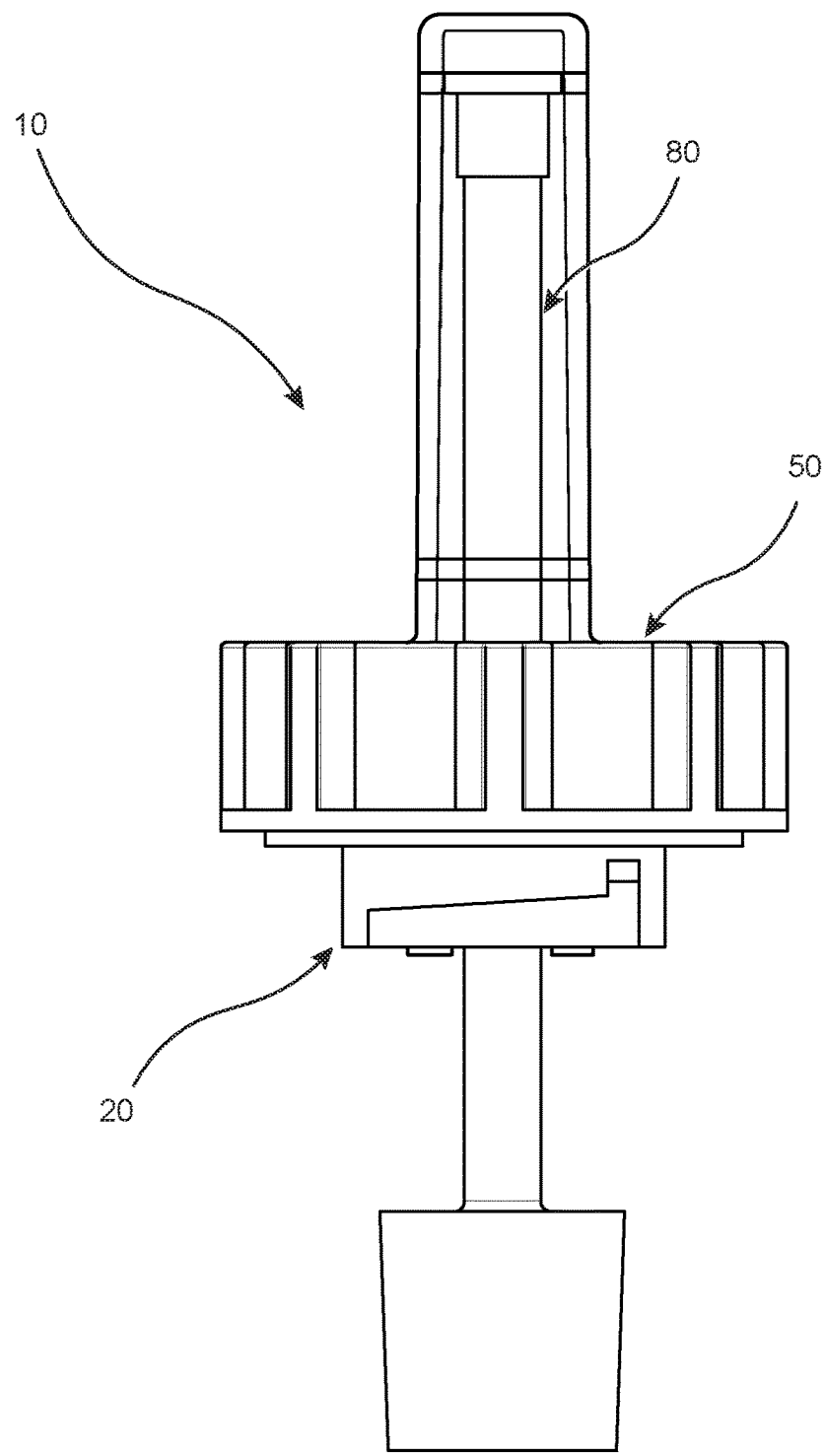
FIG. 1 is a side elevational view of an electrolyte level gauge according to an embodiment of the present invention.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-9 show an electrolyte level gauge 10 for a battery 12 according to an embodiment of the present invention. The gauge 10 includes a base 20, a cap 50, and an indicator 80, wherein the base 20 and the cap 50 cooperate to form a housing for receiving at least a portion of the indicator 80

As shown in FIGS. 2-6, the base 20 includes a partition 22, a first sidewall 24, and a second sidewall 26. The base 20 may be formed from any suitable rigid material such as a plastic material, for example. The partition 22 forms a substantially planar surface intermediate the first sidewall 24 and the second sidewall 26. As illustrated, the partition 22 has a periphery 31 having a substantially circular shape. The first sidewall 24 extends laterally away from the periphery 31 of the partition 22 to form a circumferentially extending wall on a first side of the partition 22. The second sidewall 26 extends from the partition 22 in a direction opposite the first sidewall 24 to form a circumferentially extending wall on a second side of the partition 22. The second sidewall 26 extends away from the partition 22 at a position spaced radially inwardly with respect to the periphery 31 of the partition 22 and the first sidewall 24. The first sidewall 24 accordingly has a greater diameter than a diameter of the second sidewall 26.

Figure 3:
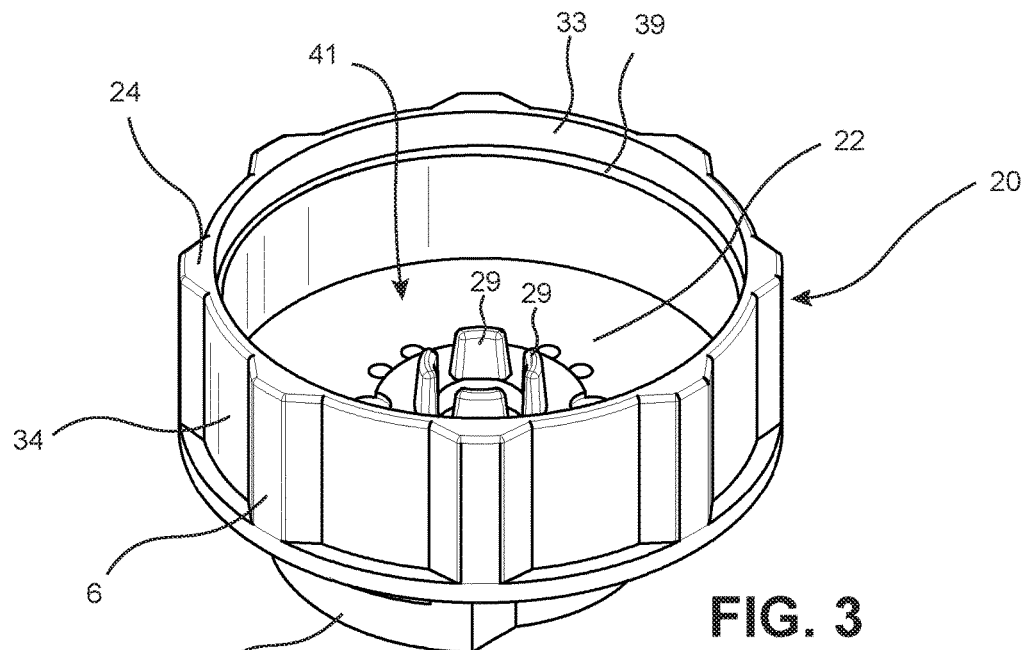
FIG. 3 is a perspective view of a base of the electrolyte level gauge illustrated in FIG. 1.

The first sidewall 24 includes an inner circumferential surface 33 and an outer circumferential surface 34. The inner circumferential surface 33 of the first sidewall 24 and the partition 22 cooperate to define a substantially cylindrically shaped first opening 41 of the base 20, as shown in FIG. 3. The inner circumferential surface 33 may include a radially inwardly extending rib 39 formed thereon and circumscribing an entirety of the first sidewall 24. The outer circumferential surface 34 of the first sidewall 24 may include a means 6 for gripping and rotating the gauge 10. Various means 6 for gripping and rotating the gauge 10 can be employed such as tabs, knurls, spanner recesses, or any other structure which facilitates application of a maximum torsional force on the gauge 10, for example. In the illustrated embodiment, the means 6 includes a plurality of raised ribs formed about the outer circumferential surface 34 of the first sidewall 24.

The second sidewall 26 includes an inner circumferential surface 35 and an outer circumferential surface 36. The inner circumferential surface 35 of the second sidewall 26 and the partition 22 cooperate to define a substantially cylindrically shaped second opening 42 of the base 20. The outer circumferential surface 36 of the second sidewall 26 includes a pair of diametrically opposed, radially outwardly extending bayonet tabs 40. Each of the bayonet tabs 40 extends radially outwardly from the second sidewall 26 of the base 20. An outer surface 43 of each of the bayonet tabs 40 may be concentrically formed with an outer surface of the sidewall 26. As illustrated, each of the bayonet tabs 40 may circumscribe about 90 degrees around the second sidewall 26.

Each of the bayonet tabs 40 includes a substantially planar lower surface 46. In the illustrated embodiment, each of the lower surfaces 46 is arranged substantially parallel to the partition 22 at one end of the base 20. In alternate embodiments, the lower surfaces 46 of the bayonet tabs 40 may be formed at an incline with respect to the partition 22, as explained in greater detail hereinafter.

Each of the bayonet tabs 40 further includes an upper surface 47. In the illustrated embodiment, each of the upper surfaces 47 is formed at an incline as each of the upper surfaces 47 extends in a circumferential direction around the base 20. Thus, an axial distance between the lower surface 46 and the upper surface 47 of each of the bayonet tabs 40 varies with respect to a rotational position along the outer circumferential surface 36 of the second sidewall 26. In the illustrated embodiment, the axial distance between the lower surface 46 and the upper surface 47 of each of the bayonet tabs 40 increases with respect to one common circumferential direction of the base 20.

The upper surface 47 of each of the bayonet tabs 40 may further include a stop 48 formed at an end of each of the bayonet tabs 40 having the greatest axial distance formed between the lower surface 46 and the upper surface 47 thereof. The stop 48 may be in the form of a projection extending from the upper surface 47 of each of the bayonet tabs 40 in an axial direction of the base 20. The stop 48 may include at least one stopping surface 49 arranged perpendicular to each of the portion of the second sidewall 26 from which the stop 48 extends and the lower surface 46 of each of the bayonet tabs 40.

An annular sealing member 32 extends around the outer circumferential surface 36 of the second sidewall 26 at an intersection of the partition 22 and the second sidewall 26. The sealing member 32 is configured for compression during a process of installing the gauge 10 within the battery 12, as explained in greater detail hereinafter. Any suitable material may be used to form the sealing member 32, as desired, including an elastomeric material.

A pair of markers (not shown) (i.e. arrows or the like) corresponding to a location of each of the bayonet tabs 40 may be formed on a perimeter of one or both of the outer circumferential surface 34 of the first sidewall 24 and the outer circumferential surface 36 of the second sidewall 26. The markers may facilitate alignment of the bayonet tabs 40 with a corresponding portion of a battery assembly receiving the gauge 10.

Figure 4:
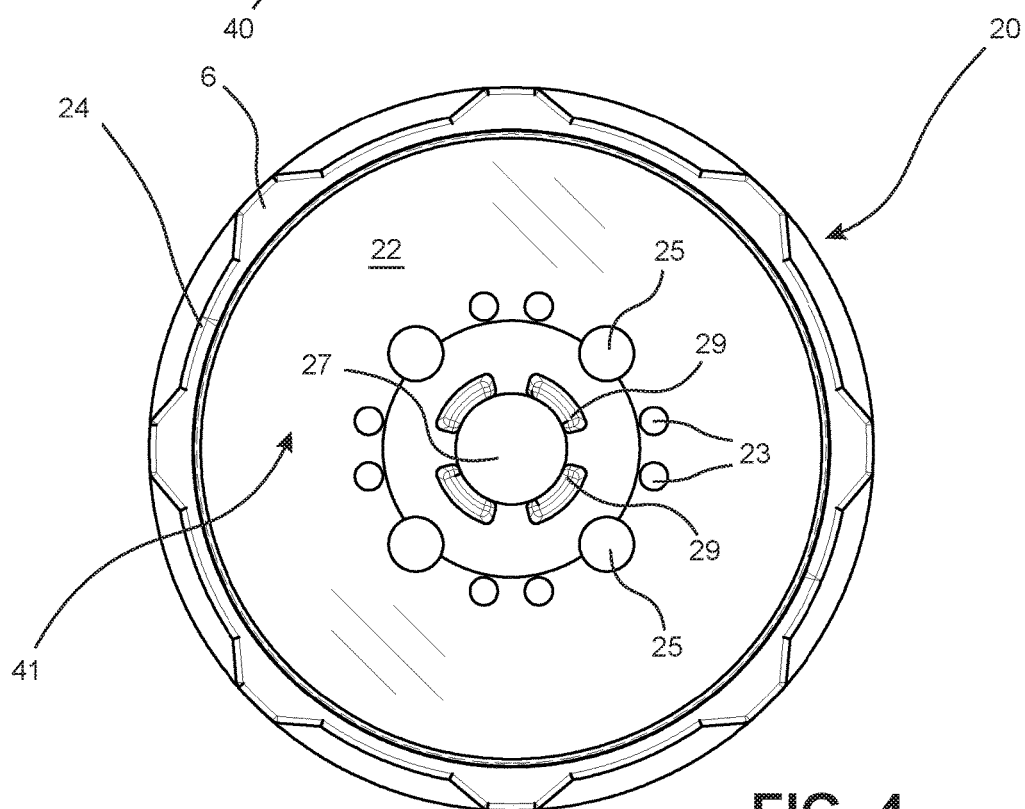
FIG. 4 is a top plan view of the base of the electrolyte level gauge.
Figure 5:
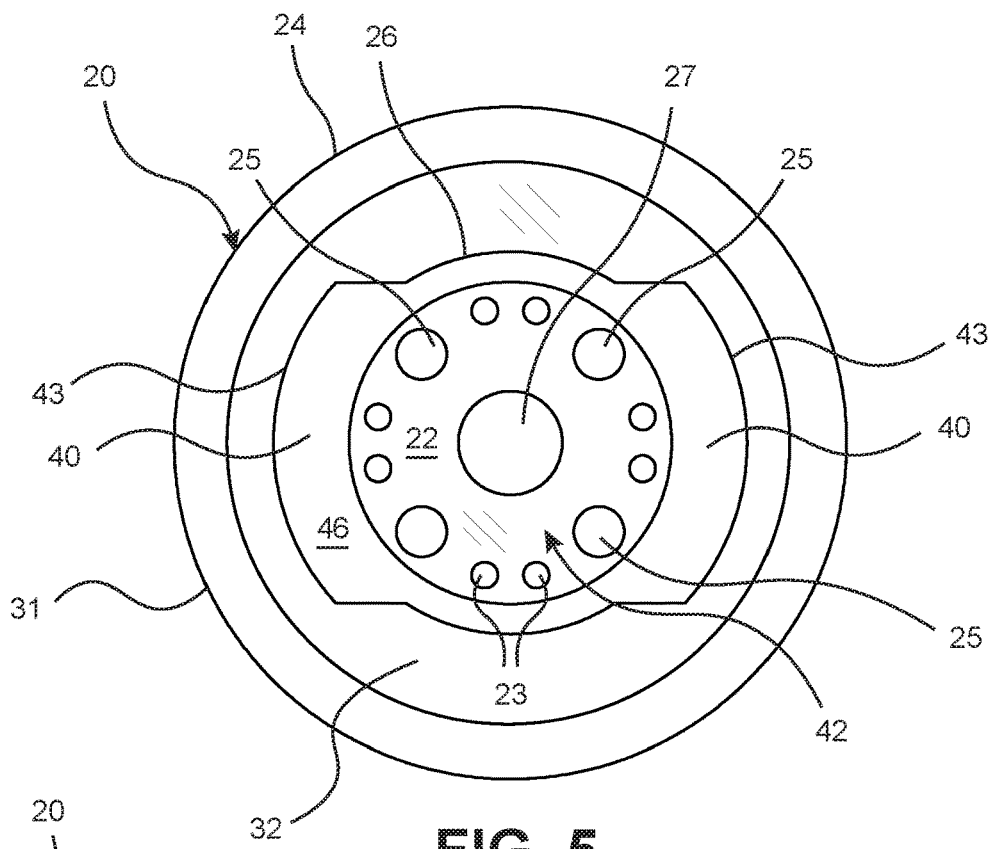
FIG. 5 is a bottom plan view of the base of the electrolyte level gauge.
Figure 6:
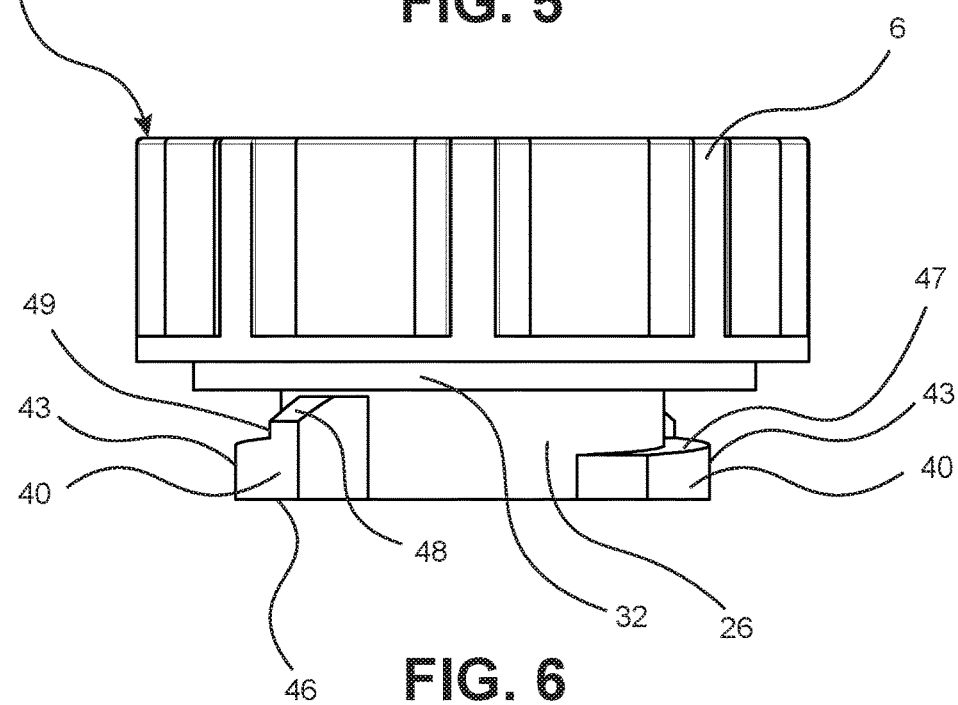
FIG. 6 is a side elevational view of the base of the electrolyte level gauge.

The partition 22 of the base 20 includes a plurality of apertures 23, 25, 27 formed therein, as best shown in FIGS. 3-5. The apertures 23, 25, 27 provide fluid communication between the first opening 41 disposed on a first side of the partition 22 and the second opening 42 disposed on a second side of the partition 22. In the illustrated embodiment, the apertures 23, 25, 27 include a plurality of vent apertures 23, a plurality of coupling apertures 25, and a centrally located indicator aperture 27. The indicator aperture 27 has a substantially circular cross-sectional shape and is configured to receive at least a portion of the indicator 80 therein. A plurality of projections 29 surround the indicator aperture 27 and cooperate to form a sleeve-like structure for also receiving at least a portion of the indicator 80 therein. Each of the coupling apertures 25 is disposed radially outwardly from the indicator aperture 27 and configured to receive a portion of the cap 50 to couple the cap 50 to the base 20, as explained in greater detail with reference to a description of the cap 50. Each of the vent apertures 23 is disposed radially outwardly from the indicator aperture 27 and provides a flow path for fluids to pass between the first opening 41 and the second opening 42 of the base 20.

Figure 2:
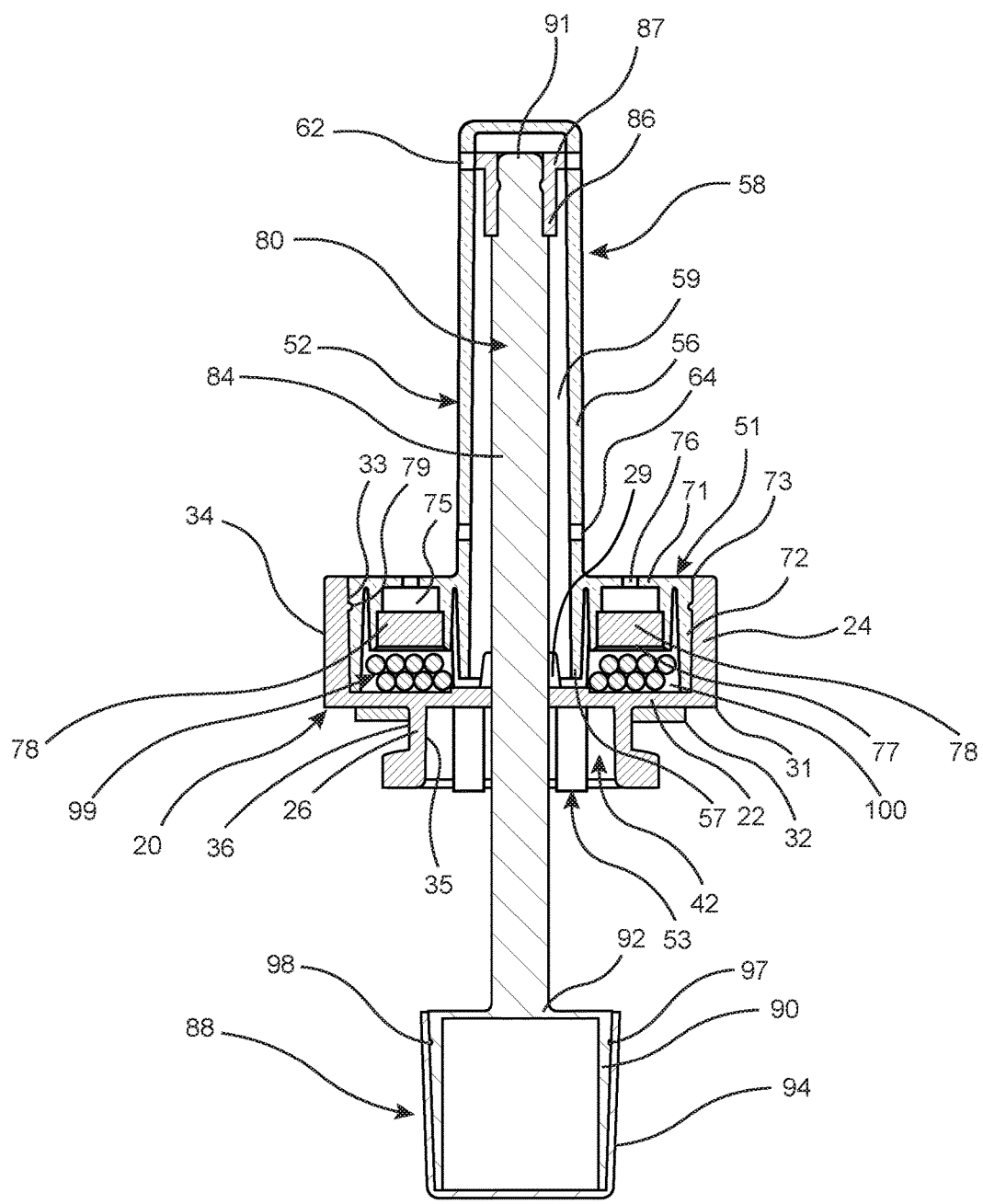
FIG. 2 is a cross-sectional side elevational view of the electrolyte level gauge illustrated in FIG. 1.
Figure 7:
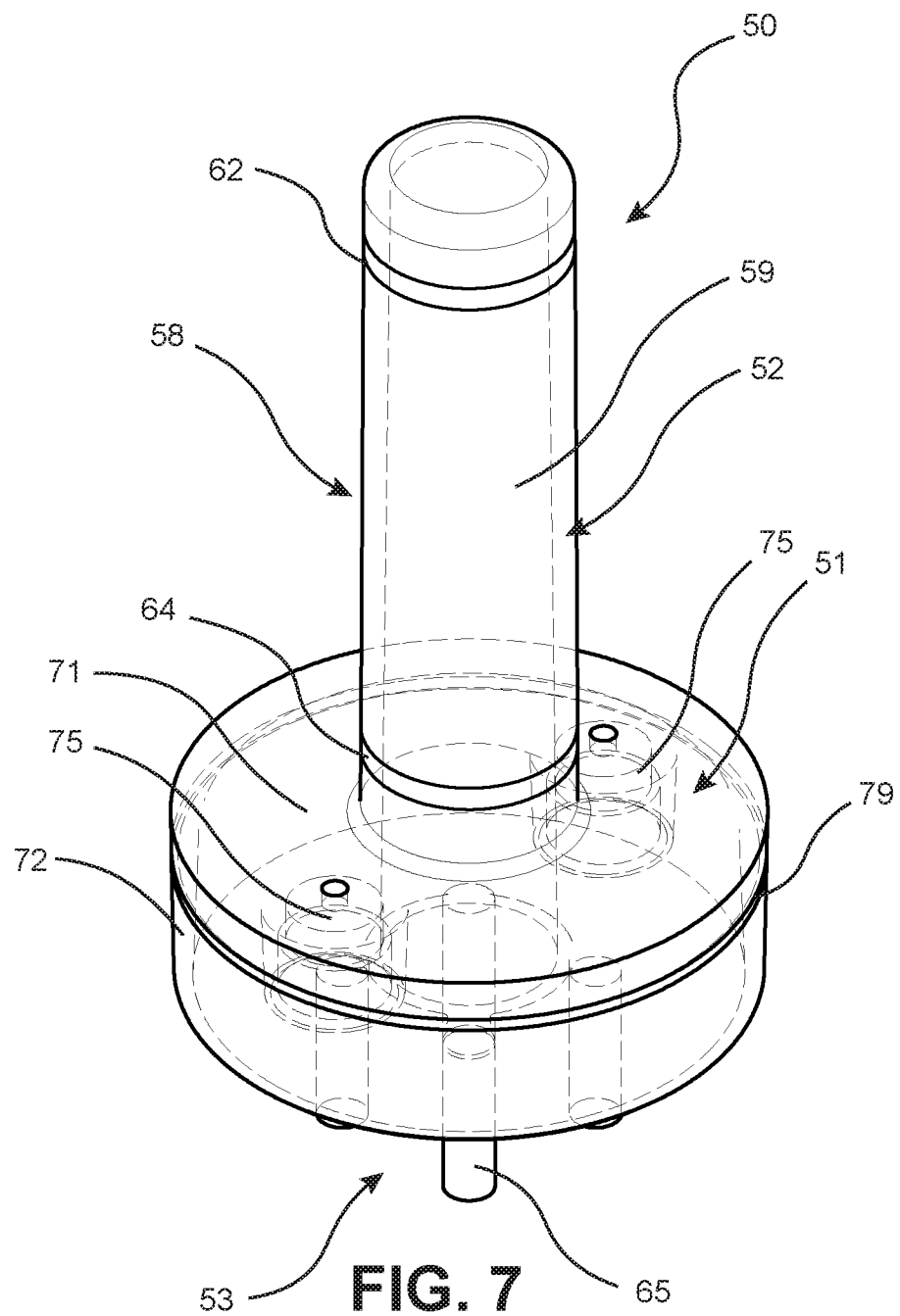
FIG. 7 is a perspective view of a cap of the electrolyte level gauge illustrated in FIG. 1.
Figure 8:
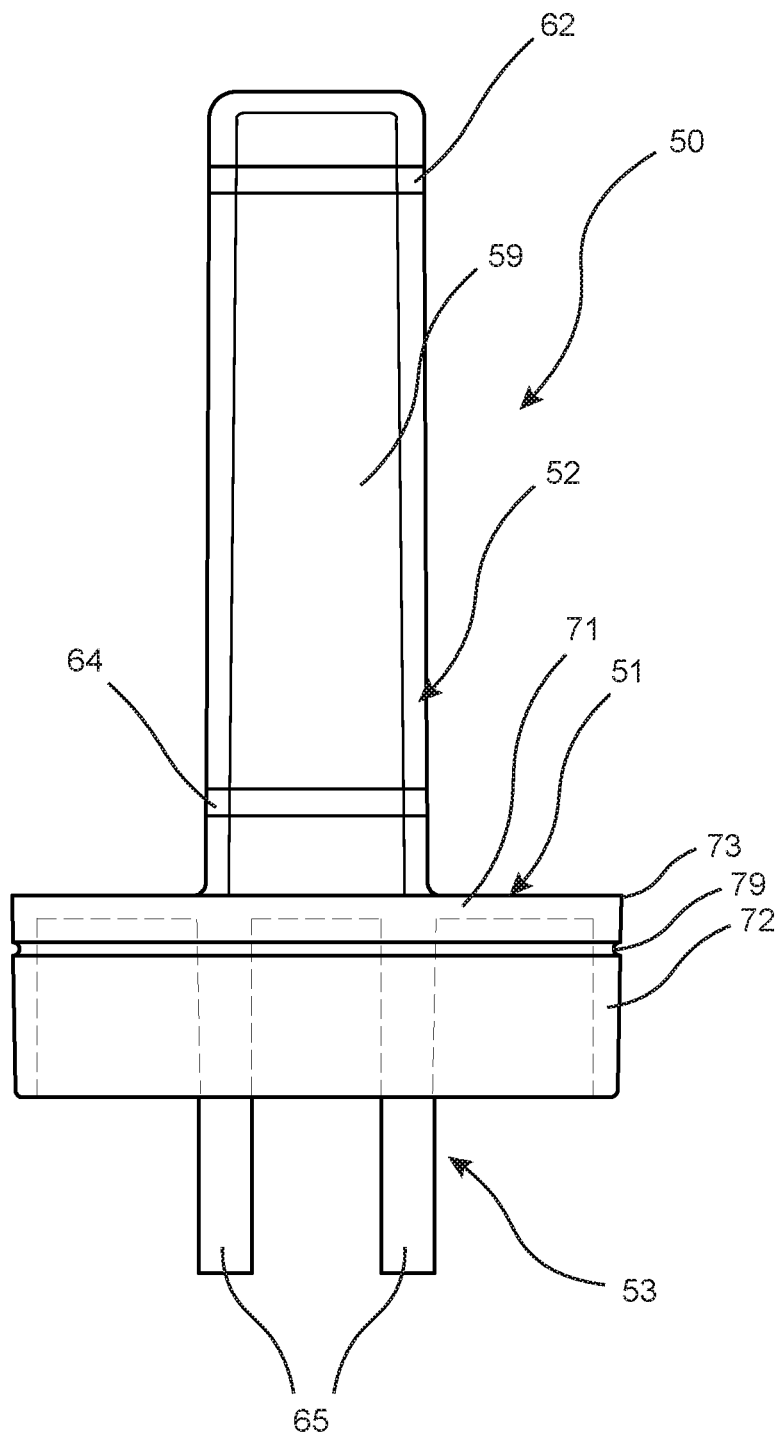
FIG. 8 is a side elevational view of the cap of the electrolyte level gauge.

As shown in FIGS. 2, 7, and 8, the cap 50 includes a cover portion 51, an indicator housing 52, and a coupling portion 53. The cover portion 51 has an upper wall 71 and an axially extending sidewall 72 extending from a periphery 73 of the upper wall 71. The sidewall 72 includes a radially inwardly extending groove 79 formed about a circumference of an outer surface of the sidewall 72. The indicator housing 52 is substantially cylindrical and includes an upper portion 56 and a lower portion 57 (as best shown in FIG. 2), wherein the upper wall 71 of the cover portion 51 intersects the indicator housing 52 at a boundary between the upper portion 56 and the lower portion 57 thereof.

The upper portion 56 of the indicator housing 52 forms a sight member 58 facilitating viewing a hollow interior 59 of the indicator housing 52. The hollow interior 59 of the indicator housing 52 is substantially cylindrical and configured to receive the indicator 80 therein. The sight member 58 may be formed from a transparent material, a translucent material, or other material having at least a portion thereof suitable for providing visual access to the hollow interior 59 of the indicator housing 52. The sight member 58 may be a substantially rigid transparent material such as a plastic material, for example. In some embodiments, the entirety of the cap 50, including the indicator housing 52, the cover portion 51, and the coupling portion 53, may be formed monolithically from a single transparent material. For example, FIG. 7 illustrates the interior portions of the cap 50 that may be visible through the transparent material in phantom lines to show the spatial relationships present between the interior and exterior features of the cap 50. In other embodiments, the cap 50 may be formed as a multi-part assembly wherein the individual components are coupled using fastening means or adhesives, as non-limiting examples. If a multi-part assembly is used, the indicator housing 52 may be formed from a transparent material while the cover portion 51 and the coupling portion 53 may be formed from an opaque material or other materials, as desired. In other embodiments, only the upper portion 56 of the indicator housing 52 forming the sight member 58 is formed from a transparent material while the remainder of the cap 50 is formed from an opaque material or other materials, as desired. Any combination of transparent, semi-transparent, translucent, and opaque materials may be used, as long as the indicator 80 is visible within the sight member 58.

The sight member 58 includes a high level marking 62 and a low level marking 64 formed on an outer surface thereof. The high level marking 62 is formed adjacent a distal end of the sight member 58 while the low level marking 64 is formed adjacent the upper wall 71 of the cover portion 51. The high level marking 62 and the low level marking 64 allow a user of the gauge 10 to determine a visual relationship between the indicator 80 and the sight member 58.

The coupling portion 53 of the cap 50 may include a plurality of protuberances 65 depending from a portion of the upper wall 71 of the cap 50. FIG. 8 shows the upper wall 71 and a portion of each of the protuberances 65 in phantom to better illustrate the relationship between the protuberances 65 and the upper wall 71. The protuberances 65 may for example extend from a periphery of a junction of the lower portion 57 of the indicator housing 52 and the upper wall 71 of the cover portion 51. However, the protuberances 65 may be formed at any location along an underside of the cap 50 without departing from the scope of the present invention.

As illustrated, the cap 50 includes four of the protuberances 65 equally spaced about a periphery of the lower portion 57 of the indicator housing 52. The protuberances 65 may be substantially cylindrical and are configured to be received within the coupling apertures 25 of the base 20. The protuberances 65 may be sized to be frictionally received within the coupling apertures 25 to aid in stabilizing the gauge 10 when the cap 50 is coupled to the base 20. The frictional fit formed between the protuberances 65 and the portions of the base 20 defining the coupling apertures 25 may be selected to allow for manual removal of the cap 50 from the base 20 when a sufficient axial force is applied thereto. It should also be understood that alternative methods of coupling the base 20 to the cap 50 may be employed without departing from the scope of the present invention such as the use of fasteners or adhesives, as non-limiting examples.

As best shown in FIGS. 2 and 7, a pair of chambers 75 depends downwardly from the upper wall 71 of the cover portion 51. The chambers 75 are shown as formed at diametrically opposed sides of the indicator housing 52, but the chambers 75 may be formed at any position within the upper wall 71 without departing from the scope of the present invention. The chambers 75 may be substantially cylindrical or other shape, as desired. Each of the chambers 75 includes an upper aperture 76 and a lower aperture 77. Each of the upper apertures 76 provides fluid communication between the interior of each of the chambers 75 and the ambient environment while each of the lower apertures 77 provides fluid communication between the interior of each of the chambers 75 and an underside of the cap 50. Each of the chambers 75 further includes a flame arrestor 78 disposed therein.

As shown in FIGS. 1 and 2, the indicator 80 of the gauge 10 includes a stem 84 having a piston 86 disposed at a first end 91 and a float 88 disposed at a second end 92. In the illustrated embodiment, the piston 86 is removably attached to the first end 91. The piston 86 may include a flange 87 extending radially outwardly therefrom. Additionally, the piston 86 may be colored to provide contrast with the stem 84, thereby increasing visibility of the piston 86 within the sight member 58. The float 88 may be bipartite and may include a float body 90 formed integrally with the second end 92 of the stem 84, and a separately formed float cap 94. The float body 90 is shown as including a radially inwardly extending groove 97 formed about a circumference of the float body 90 while the float cap 94 is shown as including a radially outwardly extending rib 98 formed about a circumference thereof.

With reference to FIG. 2, a method of assembling the gauge 10 is disclosed. First, the float cap 94 is press fit over the float body 90 until the rib 98 of the float cap 94 is received within the groove 97 of the float body 97 to couple the float cap 94 to the float body 90, thereby forming the float 88. The stem 84 of the indicator 80 is slidingly received through the indicator aperture 27 of the base 20 in the absence of the piston 86 attached to the first end 91 of the stem 84. The projections 29 surrounding the indicator aperture 27 cooperate to act as a sleeve for orienting the stem 84 of the indicator 80 within the indicator housing 52. The piston 86 is received over the first end 91 of the stem 84 to complete assembly of the indicator 80. Following construction of the float 88, the piston 86 of the indicator 80 is received within the hollow interior 59 of the indicator housing 52.

Prior to the coupling of the cap 50 to the base 20, a plurality of condensing elements 99 is disposed on the partition 22 of the base 20 outboard of the indicator aperture 27 and inboard of the first sidewall 24. The condensing elements 99 may be any surface area increasing feature suitable for forming a surface for a fluid to condense thereon. The condensing elements 99 may be a plurality of pellets or particles, for example. The condensing elements 99 may be formed of a polymeric material, as desired. In the illustrated embodiment, the condensing elements 99 have a spherical shape to maximize the exposed surface area of each of the condensing elements 99. However, other shapes of the condensing elements 99 may also be utilized such as a box cylindrical shape, a polygonal shape, a cone shape, or combinations thereof.

The cap 50 is coupled to the base 20 following the introduction of the condensing elements 99. The protuberances 65 extending downwardly from the cap 50 are received within the coupling apertures 25 formed in the partition 22 of the base 20. The sidewall 72 of the cover portion 51 of the cap 50 is then received within the first sidewall 24 of the base 20 until the rib 39 of the base 20 is received into the groove 79 of the cap 50, thereby snap-fitting the cap 50 to the base 20. As the cap 50 and the base 20 are moved axially towards each other, the lower portion 57 of the indicator housing 52 is brought adjacent the partition 22 of the base 20 to prevent entry of the condensing elements 99 into the indicator housing 52 during use of the gauge 10.

Figure 9:
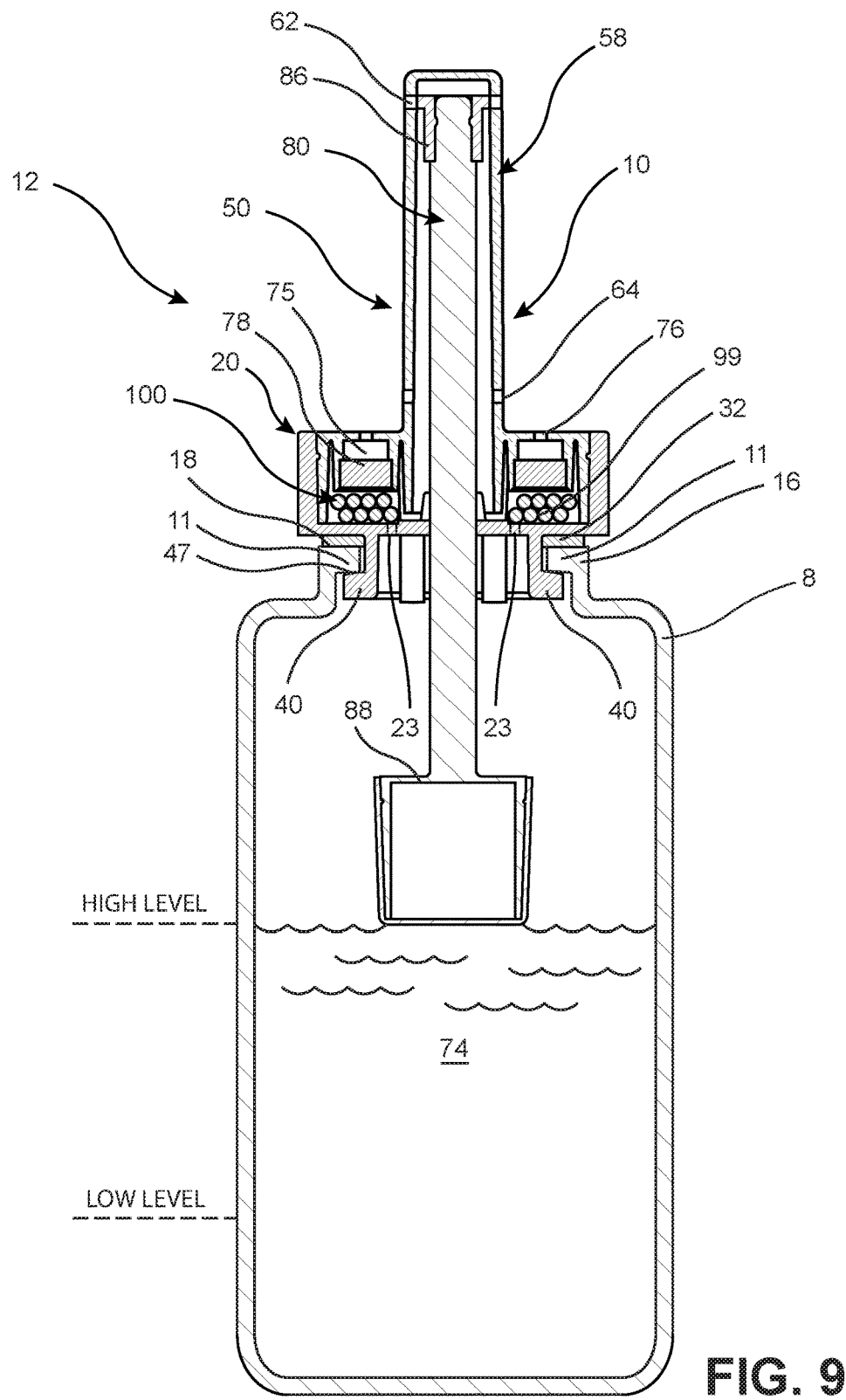
FIG. 9 is a cross-sectional side elevational view of a battery assembly including the electrolyte level gauge of FIG. 1.

As best shown in FIGS. 2 and 9, which show the gauge 10 in cross-section, the coupling of the cap 50 to the base 20 results in the formation of a condensation chamber 100 formed by the cooperation of the partition 22, the sidewall 72 of the cap 50, the upper wall 71 of the cap 50, and an outer surface of the lower portion 57 of the indicator housing 52. The condensation chamber 100 is in fluid communication with each of the chambers 75 through each of the lower apertures 77, and each of the chambers 75 are further in fluid communication with the ambient environment through each of the upper apertures 76. The upper apertures 76 accordingly form vent apertures for allowing fluid disposed within the condensation chamber 100 to exit to the ambient environment. The condensation chamber 100 is also in fluid communication with an underside of the base 20 via each of the vent apertures 23. The indicator 80 is disposed within the indicator housing 52 and configured to reciprocate therein in an axial direction of the indicator 80 and the sight member 58.

As shown in FIG. 9, the gauge 10 is configured for use with a battery 12 having at least one vent port 16 formed in a housing 8 of the battery 12. In certain embodiments, a plurality of vent ports 16 can be formed in the housing 8 in any pattern or configuration as desired, such as in a diagonal configuration or a linear configuration, for example. As shown, the vent port 16 includes a rim 18 and may include a pair of diametrically opposed, radially inwardly extending bayonet tabs 11. In a non-limiting example, each of the bayonet tabs 11 includes a substantially planer upper surface and a substantially planar lower surface. The battery 12 may also include other features and components necessary for operation of the battery 12, such as a pair of terminals (not shown) and a pair of mounting structures (not shown), for example.

In an alternative embodiment, each of the upper surface 46 and the lower surface 47 of each of the bayonet tabs 40 may be inclined in the radial direction with respect to the partition 22 to facilitate movement of the bayonet tabs 40 of the gauge 10 past the bayonet tabs 11 of the vent port 16 when the gauge 10 is inserted into the vent port 16. It is also understood that the structure of the bayonet tabs 40 of the gauge 10 could be formed on the vent port 16 and the structure of the bayonet tabs 11 of the vent port 16 could be formed on the base 20 of the gauge 10 to essentially reverse the cooperating structures without departing from the scope of the present invention.

During installation of the gauge 10 within the battery 12, the gauge 10 is first aligned with the vent port 16 of the housing 8. More particularly, the bayonet tabs 40 of the gauge 10 are aligned with spaces present intermediate the respective bayonet tabs 11 of the vent port 16 by reference to the markings formed on the bayonet tabs 40 of the base 20. The second sidewall 26 of the base 20 is inserted into the vent port 16 and the gauge 10 is rotated, wherein the upper surfaces 47 of the bayonet tabs 40 of the gauge 10 slidingly contact the bayonet tabs 11 of the vent port 16. As the gauge 10 is rotated, the inclined upper surfaces 47 of the bayonet tabs 40 cause the sealing member 32 to be compressed between the partition 22 of the base 20 and the rim 18 of the vent port 16. In an alternate embodiment, the lower surfaces 46 of the bayonet tabs 40 may be inclined to allow the gauge 10 to be inserted into the vent port 16 without requiring additional rotation of the gauge 10.

In operation, the float 88 of the indicator 80 is disposed within the battery 12 and is buoyant in an electrolyte 74 disposed within the housing 8 of the battery 12. The housing 8 may have any suitable shape for retaining the electrolyte therein. The condensation chamber 100 is in fluid communication with the electrolyte 74 via the vent apertures 23. More specifically, a portion of the electrolyte 74 that has evaporated within the battery 12 is able to flow upwardly and through the vent apertures 23 to enter the condensation chamber 100.

An axial position of the piston 86 within the sight member 58 is directly related to a level of the electrolyte 74 within the housing 8 of the battery 12, wherein a high level of the electrolyte 74 within the battery 12 is indicated when the piston 86 is adjacent the high level marking 62 of the sight member 58 and a low level of the electrolyte 74 within the battery 12 is indicated when the piston 86 is adjacent the low level marking 64 of the sight member 58. A user of the gauge 10 therefore determines a level of the electrolyte 74 within the battery 12 by comparing a position of the flange 87 of the piston to the positions of the high level marking 62 and the low level marking 64 formed on the sight member 58.

As the electrolyte 74 evaporates, the gauge 10 aids in condensing the evaporated electrolyte 74 vented from the battery 12. The vent gases flow upwardly toward the gauge 10 and enter the second opening 42 of the base 20 defined by the second sidewall 26 and the partition 22. The vent gases are then directed into the condensation chamber 100 through one of the vent apertures 23 formed in the partition 22 of the base 20 (two of the vent apertures 23 are shown in phantom in FIG. 9 as the vent apertures 23 are disposed out of the plain of the cross-section of FIG. 9). The maximized surface area presented by the condensing elements 99 within the condensation chamber 100 creates an efficient condensing surface which causes the vented electrolyte 74 gases to condense thereon. The condensed electrolyte 74 is then able to drain back into the battery 12 via the vent apertures 23, thereby minimizing required electrolyte balancing within the battery 12. The removal of the condensed electrolyte 74 from the vent gases also helps keep the top surfaces of the battery 12 clean and eliminates dangerous and irritating fumes. Other liquid and solid contaminants present in the vent gases are also removed. The vent gases then pass from the condensation chamber 100 into each of the chambers 75 by passing through each of the lower apertures 77. The vent gases then pass through each of the flame arrestors 78 before exiting the gauge 10 and entering the ambient environment through the upper apertures 76 of each of the chambers 75.

When removal of the gauge 10 from the vent port 16 is desired, such as for battery 12 maintenance or service, for example, the gauge 10 is disengaged from the vent port 16. More particularly, force is applied to the means 6 for gripping and rotating the gauge 10. The applied force causes a rotational movement of the gauge 10. As the gauge 10 rotates, the bayonet tabs 40 of the gauge 10 slidingly contact, and ultimately disengage from the bayonet tabs 11 of the vent port 16. The gauge 10 as shown rotates less than about 90 degrees in either a counter-clockwise direction or a clockwise direction to disengage the gauge 10 from the vent port 16. It is understood, however, that the gauge 10 can be configured to rotate in only the counter-clockwise direction or clockwise direction and to rotate through any desired degree of rotation, as desired, to disengage the gauge 10 from the vent port 16. Once the bayonet tabs 40 are released, the gauge 10 is removed from the vent port 16 by an axial movement thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrolyte level gauge comprising:
    a housing defining a condensation chamber having a plurality of condensing elements disposed therein, the condensation chamber in fluid communication with an electrolyte through a first vent aperture and an ambient environment through a second vent aperture, wherein the condensing elements are pellets;
    a sight member having a hollow interior; and
    an indicator having a first end slidingly disposed in the hollow interior of the sight member and a second end including a float, the float configured to be buoyant on the electrolyte.

2. The electrolyte level gauge of claim 1, wherein the pellets have a spherical shape.

3. The electrolyte level gauge of claim 1, wherein the condensing elements are formed from a polymeric material.

4. The electrolyte level gauge of claim 1, wherein the housing defining the condensation chamber is formed by the cooperation of a cap and a base.

5. The electrolyte level gauge of claim 4, wherein the first vent aperture is formed in the base and the second vent aperture is formed in the cap.

6. The electrolyte level gauge of claim 4, wherein the sight member forms a portion of the cap.

7. The electrolyte level gauge of claim 4, wherein the base includes a coupling aperture formed therein configured to receive a protuberance extending from the cap.

8. The electrolyte level gauge of claim 7, wherein the base includes an indicator aperture for receiving a stem of the indicator, the stem of the indicator formed intermediate the first end and the second end thereof.

9. The electrolyte level gauge of claim 4, wherein the base includes a coupling feature.

10. The electrolyte level gauge of claim 9, wherein the coupling feature is a bayonet tab having a circumferentially extending inclined surface.

11. The electrolyte level gauge of claim 4, wherein the base includes a partition having the first vent aperture formed therein, a first sidewall extending from a first side of the partition, and a second sidewall extending from a second side of the partition.

12. The electrolyte level gauge of claim 11, wherein the cap includes a third sidewall having a first coupling feature configured to cooperate with a second coupling feature of the first sidewall.

13. The electrolyte level gauge of claim 11, wherein a sealing member is disposed at an intersection of the partition and the second sidewall.

14. The electrolyte level gauge of claim 1, wherein a flame arrestor is disposed between the first vent aperture and the second vent aperture.

15. The electrolyte level gauge of claim 1, wherein the sight member includes at least one marking.

16. The electrolyte level gauge of claim 15, wherein a position of the first end of the indicator relative to the at least one marking of the sight member corresponds to a level of the electrolyte within an electrolyte housing chamber containing the electrolyte.

17. The electrolyte level gauge of claim 1, wherein an evaporated portion of the electrolyte is condensed on the condensing elements, the condensed electrolyte configured to drain through the first vent aperture to return the condensed electrolyte to an electrolyte housing chamber containing the electrolyte.

18. An electrolyte level gauge comprising:
    a housing defining a condensation chamber having a plurality of condensing elements disposed therein, the condensation chamber in fluid communication with an electrolyte through a first vent aperture and an ambient environment through a second vent aperture, wherein the housing defining the condensation chamber is formed by the cooperation of a cap and a base, and wherein the base includes a coupling aperture formed therein configured to receive a protuberance extending from the cap;
    a sight member having a hollow interior; and
    an indicator having a first end slidingly disposed in the hollow interior of the sight member and a second end including a float, the float configured to be buoyant on the electrolyte.

19. An electrolyte level gauge comprising:
    a housing defining a condensation chamber having a plurality of condensing elements disposed therein, the condensation chamber in fluid communication with an electrolyte through a first vent aperture and an ambient environment through a second vent aperture, wherein the housing defining the condensation chamber is formed by the cooperation of a cap and a base, wherein the base includes a coupling feature, and wherein the coupling feature is a bayonet tab having a circumferentially extending inclined surface;
    a sight member having a hollow interior; and
    an indicator having a first end slidingly disposed in the hollow interior of the sight member and a second end including a float, the float configured to be buoyant on the electrolyte.

20. An electrolyte level gauge comprising:
    a housing defining a condensation chamber having a plurality of condensing elements disposed therein, the condensation chamber in fluid communication with an electrolyte through a first vent aperture and an ambient environment through a second vent aperture, wherein the housing defining the condensation chamber is formed by the cooperation of a cap and a base, and wherein the base includes a partition having the first vent aperture formed therein, a first sidewall extending from a first side of the partition, and a second sidewall extending from a second side of the partition;
    a sight member having a hollow interior; and
    an indicator having a first end slidingly disposed in the hollow interior of the sight member and a second end including a float, the float configured to be buoyant on the electrolyte.

* * * * *